United States Patent [19]

Abbas

[11] Patent Number: 5,431,590
[45] Date of Patent: Jul. 11, 1995

[54] BOW MOUNTED GAME ANIMAL CALLER

[76] Inventor: Frederick M. Abbas, 1519 Salina, Dearborn, Mich. 48120

[21] Appl. No.: 119,952

[22] Filed: Sep. 10, 1993

[51] Int. Cl.⁶ ............................................. A63H 5/00
[52] U.S. Cl. .................................. 446/207; 446/397; 124/90
[58] Field of Search ............... 446/207, 208, 209, 202, 446/200, 206, 397, 404; 124/86, 88, 90; 42/85, 90, 106, 71.01

[56] References Cited

U.S. PATENT DOCUMENTS

| | | | |
|---|---|---|---|
| 2,961,135 | 11/1960 | Hughes, Jr. | 446/202 X |
| 3,866,592 | 2/1975 | Carella | 124/88 |
| 4,280,299 | 7/1981 | Oka | 446/206 |
| 4,586,482 | 5/1986 | Di Pietro | 446/473 |
| 4,656,746 | 4/1987 | Gillespie | 124/90 X |
| 4,852,287 | 8/1989 | Martin | 42/90 |
| 4,915,660 | 4/1990 | Overholt, Sr. | 446/207 |
| 5,035,390 | 7/1991 | Sanders | 446/397 X |
| 5,111,981 | 5/1992 | Allen | 446/397 X |
| 5,211,596 | 5/1993 | Bradshaw | 446/302 |
| 5,244,430 | 9/1993 | Legursky | 446/397 |

FOREIGN PATENT DOCUMENTS

| | | | |
|---|---|---|---|
| 385094 | 4/1908 | France | 446/209 |
| 666306 | 10/1938 | Germany | 446/202 |

OTHER PUBLICATIONS

American Sports, Bow Scope, Aug. 1983 124-88.

*Primary Examiner*—Robert A. Hafer
*Assistant Examiner*—D. Neal Muir
*Attorney, Agent, or Firm*—Brooks & Kushman

[57] ABSTRACT

An apparatus is disclosed for calling game animals when a user is hunting with an archery bow. The apparatus comprises a main body connectable to the archery bow, and a conduit. A first end of the conduit is attached to the main body, and a second end of the conduit is attached to a bow string of the archery bow. A game attracting call can thereafter be produced when the user either draws or blows air through the conduit, such as by causing a reed in the main body to vibrate. Preferably, a nipple is connected between the main body and the first end of the conduit, and extends at about a 15 degree angle to a longitudinal axis of the main body. The nipple is rotatable with respect to the main body through a full 360 degrees to allow the first end of the conduit to be swung away from interference with other accessories of the bow.

19 Claims, 1 Drawing Sheet

BOW MOUNTED GAME ANIMAL CALLER

TECHNICAL FIELD

This invention relates to apparatus for hunting, and more particularly to a game animal caller mountable on an archery bow.

BACKGROUND ART

Devices to attract wild game animals such as deer or moose to a site where a hunter awaits are well known. One particular class of these devices produces sounds, such as antlers rubbing together or the call of another game animal, to which other game animals respond. Some of these devices are held on a cord around the user's neck but hand held while in use, while other similar sound producing apparatus are known which operate when stepped upon by the hunter.

A problem with all these devices is that the hunter must initiate some movement to operate them. Not only is such movement impractical or impossible when the hunter is maintaining an archery bow in a fully drawn position, but even when possible such movement often alerts the prey to the hunter's presence and provokes the animal to flee. Even when using devices such as those which can be continually held in the mouth and thus do not require any obvious movement to operate, it is impractical for the hunter to hold one of these devices in his or her mouth for an extended period of time.

SUMMARY OF THE INVENTION

The present invention is an apparatus for calling game animals when a user is hunting with an archery bow. The apparatus comprises a main body connectable to the archery bow, and a conduit. A first end of the conduit is attached to the main body, and a second end of the conduit is attached to a bow string of the archery bow. A game attracting call can thereafter be produced when the user either draws or blows air through the conduit, such as by causing a reed in the main body to vibrate. Preferably, a nipple is connected between the main body and the first end of the conduit, and extends at about a 15 degree angle to a longitudinal axis of the main body. The nipple is rotatable with respect to the main body through a full 360 degrees to allow the first end of the conduit to be swung away from interference with other accessories of the bow and toward the user's anchor point.

Accordingly, it is an object of the present invention to provide an apparatus of the type described above with which a hunter can produce a game animal call, without obvious movement, while holding an archery bow in a drawn or cocked position.

This and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
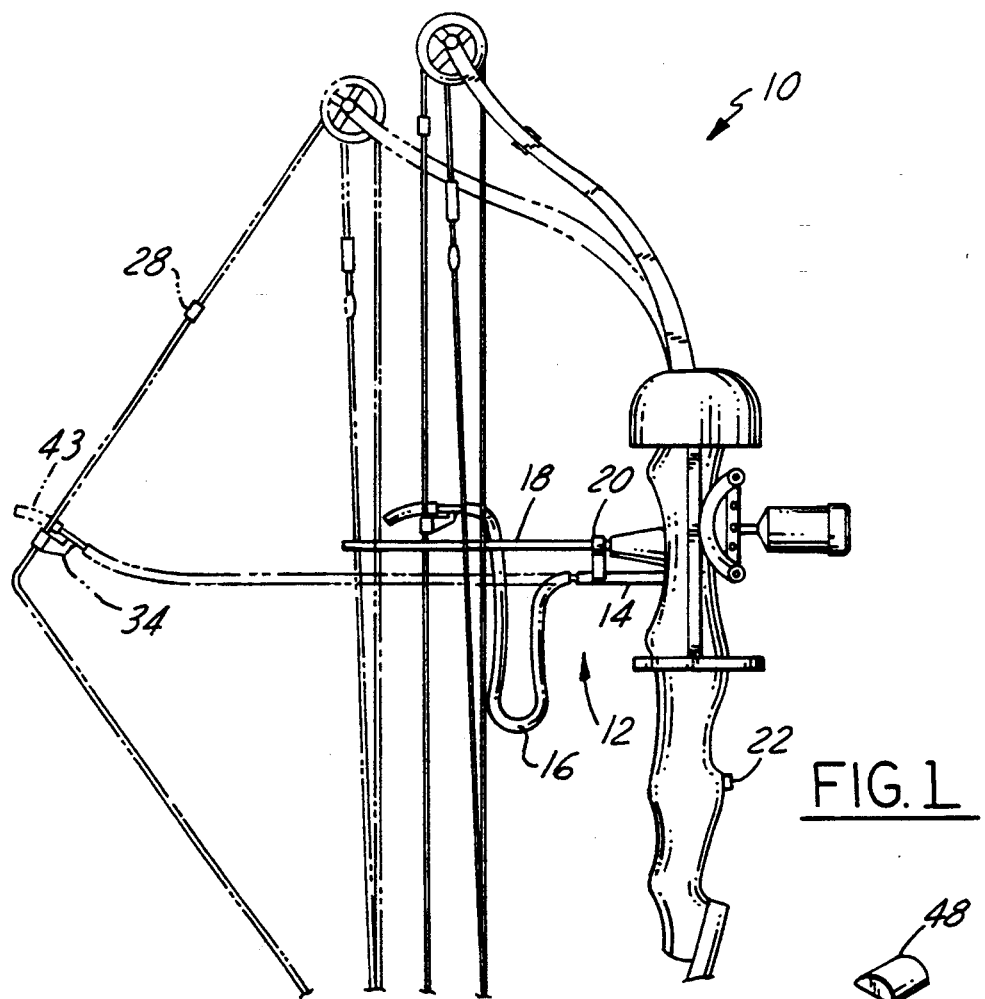
FIG. 1 is a side view of an archery bow including a bow mounted game animal caller according to the present invention.

With reference to the drawings, the preferred embodiments of the present invention will be described. FIG. 1 shows a compound archery bow 10 according to the present invention including an apparatus 12 for calling game animals to where a user is hunting with the archery bow. The game animal caller 12 includes a main body 14 and a conduit 16.

Figure 2:
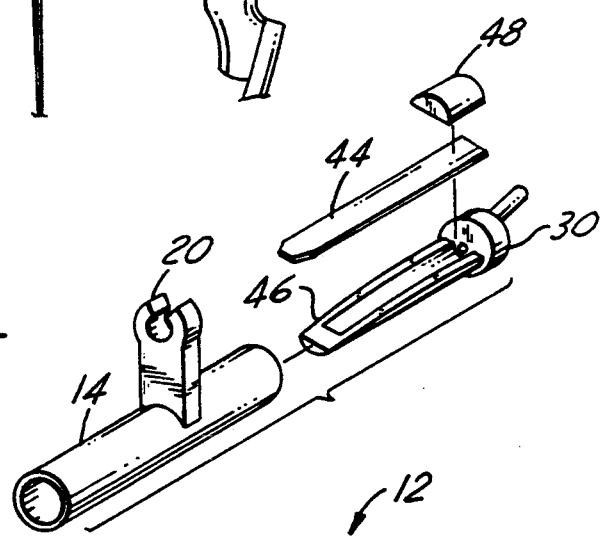
FIG. 2 is an exploded perspective view of a main body of the game animal caller including a vibratable reed insert therefor.

The main body 14 is connectable to the archery bow, preferably to a cable guard 18. For this purpose, the main body 14 is provided as best shown in FIG. 2 with a deformable, U-shaped catch 20 which can be snapped in place around the circular cable guard 18 anywhere along its length. However, the main body 14 can be connected by any conventional means to any point on or near the bow 10. For example, the main body 14 can be attached to a stabilizer bushing or insert 22, which is usually on the front of the archery bow 10, in the event that no cable guard exists on the bow.

Figure 3:
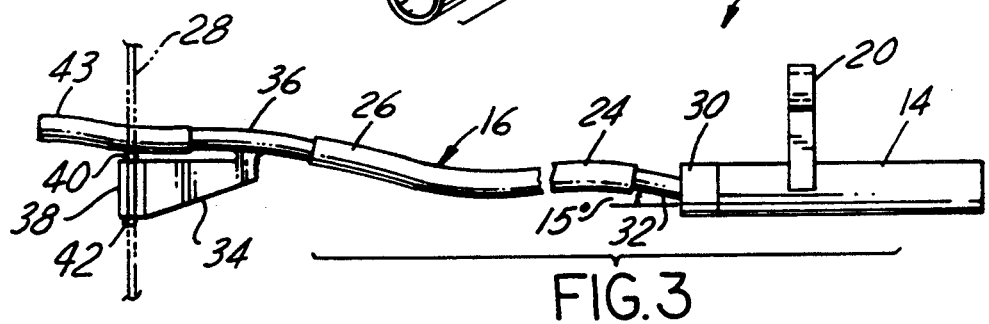
FIG. 3 is an enlarged, fragmented view of the game animal caller.

The conduit 16 is preferably a flexible rubber or other elastomeric tubing, for example one with commonly available one-quarter inch outside diameter and three-sixteenths inch inside diameter dimensions. As is best shown in FIG. 3, the conduit 16 has a first end 24 attached to the main body 14 and a second end 26 attached to a bow string 28 of the archery bow. A nipple 30 is provided on one end of the main body 14 to connect the main body and the first end 24 of the conduit 16.

The nipple 30 includes a projection 32 which extends at an angle, preferably one of about 15 degrees, to a longitudinal axis of the main body 14. The nipple 30 is rotatable with respect to the main body through a full 360 degrees so that, in conjunction with the angled projection 32, the first end 24 of the conduit 16 can be aimed in any desired direction. The second end 26 of the conduit 16 is connected to a kisser bracket 34. As is well known in archery hunting circles, the kisser bracket 34 provides an anchor point for the archer when the bow string 28 is drawn back from a relaxed position as shown in solid line in FIG. 1, to its use position as shown in phantom line.

The kisser bracket 34 includes a T-shaped tubular portion 36 and a mounting portion 38 which is attachable to the bow string 28 to retain the second end 26 of the conduit at a generally constant point along the vertical extent of the bow string. To ensure that the kisser bracket 34 is immovably mounted on the bow string 28, but still allowed to swivel with respect to the bow string, a pair of string nocks 40 and 42 may be crimped onto the bow string above and below the kisser bracket, respectively.

The conduit 16 is cut to a length, typically between about eighteen and twenty-four inches, such that the bow string 28 is drawn to the user's normal cocked position shown in phantom in FIG. 1, any sag in the conduit is taken out but the conduit is not stretched to the point that it might deform and affect the passage of air therethrough. Because the projection 32 can be rotated with the nipple 30 to extend in any direction, a given length of conduit can be used with a variety of different archers and bows, regardless of the particular user's anchor point and the location on the bow to which the main body 14 is attached. Furthermore, the rotatable nipple 30 and the angle projection 32 allow the conduit to be directed out of the way of any other bow attachments that might otherwise present interference.

With the kisser bracket 34 properly aligned on the bow string 28, the second end 26 of the conduit 16 is disposed proximate the corner of the mouth of the user when the bow string is drawn back to its use position. A short length 44 of conduit is preferably connected to one end of the T-shaped portion 36 of the kisser bracket 34 and is adapted, with the bow string 28 drawn, to be received in the user's mouth without any substantial movement.

Thereafter, the hunter can blow or draw air through the conduit 16 by inhaling or exhaling through the mouthpiece or string keeper 44. As shown in FIG. 2, a vibratable reed 44 is held in place in the main body 14 by an inner reed holder 46 and a wedge piece 48 so that a game attracting call, preferably a grunt call of an adult male deer, is produced in the main body when the user causes air to pass through the conduit 16. Of course, it will be appreciated that other means for producing a game attracting call when the user causes air to pass through conduit are readily substitutable.

It should be understood that the game animal caller of the present invention can be used with other hunting bows, including non-compound bows and crossbows. It should be also understood that while the forms of the invention herein shown and described constitute preferred embodiments of the invention, they are not intended to illustrate all possible forms thereof. Finally, the words used are words of description rather than limitation, and various changes may be made without departing from the spirit and scope of the invention disclosed.

I claim:

1. In combination with a bow having a body and a string, an apparatus for calling game animals when a user is hunting with the bow, the combination comprising:
   means for producing a game attracting call when the user causes air to pass through a conduit, the means for producing the call comprising a main body and an air-actuated sound producing member attached to the bow; and
   a flexible, extendable conduit attached to the string of the bow and the means for producing the call whereby a user may initiate a game attracting call while the bow is drawn.

2. The apparatus of claim 1 wherein the means for producing a game attracting call comprises a main body having a vibratable reed therein.

3. The apparatus of claim 2 wherein the main body is connected to a cable guard of the bow.

4. The apparatus of claim 2 wherein the main body is connected to a stabilizer bushing of the bow.

5. The apparatus of claim 2 further comprising a nipple connected between the main body and a first end of the conduit, the nipple extending at an angle to a longitudinal axis of the main body.

6. The apparatus of claim 5 wherein the nipple is rotatable with respect to the main body through a full 360 degrees.

7. The apparatus of claim 5 wherein the nipple extends at an angle of about 15 degrees to the longitudinal axis of the main body.

8. The apparatus of claim 1 further comprising a bracket attached to the string of the bow to retain a second end of the conduit.

9. The apparatus of claim 8 wherein the bracket is immovably mounted on the string of the bow.

10. In combination with an archery bow having a body and a string, an apparatus for calling game animals when a user is hunting with the archery bow, the apparatus comprising:
    a main body of an air-actuated sound-producing member connected to the archery bow; and
    a flexible, extendable conduit having a first end attached to the main body and a second end attached to a bow string of the archery bow, a game attracting call being produced in the main body when the user causes air to pass through the conduit.

11. The apparatus of claim 10 further comprising a nipple connected between the main body and the first end of the conduit, the nipple extending at an angle to a longitudinal axis of the main body.

12. The apparatus of claim 11 wherein the nipple is rotatable with respect to the main body through a full 360 degrees.

13. The apparatus of claim 11 wherein the nipple extends at an angle of about 15 degrees to the longitudinal axis of the main body.

14. The apparatus of claim 10 wherein the main body includes a vibratable reed.

15. The apparatus of claim 10 further comprising a bracket attached to the bow string to retain the second end of the conduit.

16. The apparatus of claim 15 wherein the bracket is immovably mounted on the bow string.

17. The apparatus of claim 10 wherein the conduit comprises rubber tubing.

18. The apparatus of claim 10 wherein the second end of the conduit is disposed proximate the mouth of the user when the bow string is drawn.

19. The apparatus of claim 10 wherein the main body is connected to a cable guard of the archery bow.

* * * * *